Dec. 24, 1957   J. MULLER   2,817,205
PORTABLE POWER OPERATED TOOL
Filed Dec. 22, 1953   7 Sheets-Sheet 1

INVENTOR
JACQUES MULLER
By: Young, Emery & Thompson
Attys.

INVENTOR:
JACQUES MULLER
By: Young, Emery & Thompson
Attys.

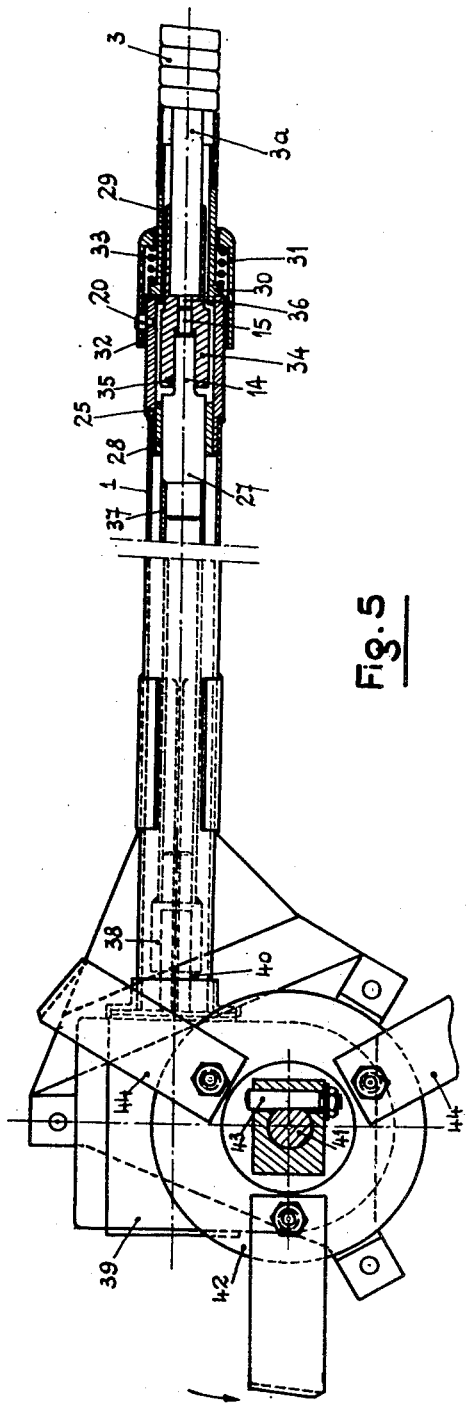
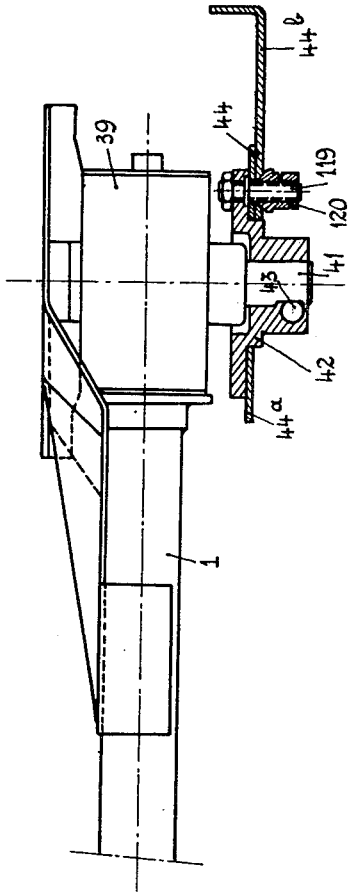

Dec. 24, 1957  J. MULLER  2,817,205
PORTABLE POWER OPERATED TOOL
Filed Dec. 22, 1953  7 Sheets-Sheet 4

INVENTOR
JACQUES MULLER
By: Young, Emery & Thompson
Attys.

Dec. 24, 1957 J. MULLER 2,817,205
PORTABLE POWER OPERATED TOOL
Filed Dec. 22, 1953 7 Sheets-Sheet 5
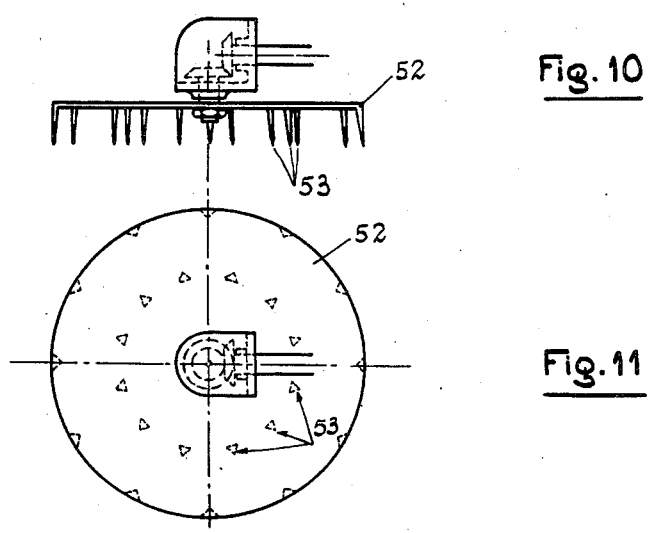
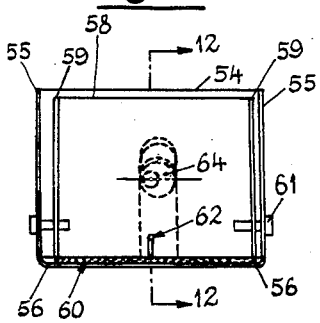
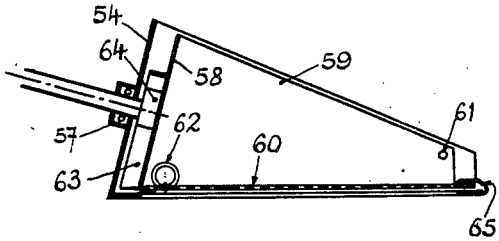
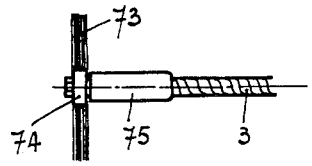
INVENTOR:
JACQUES MULLER
By: Young, Emery & Thompson
Attys.

Dec. 24, 1957   J. MULLER   2,817,205
PORTABLE POWER OPERATED TOOL
Filed Dec. 22, 1953   7 Sheets-Sheet 6

INVENTOR:
JACQUES MULLER
By: Young, Emery & Thompson
Attys.

Dec. 24, 1957 J. MULLER 2,817,205
PORTABLE POWER OPERATED TOOL
Filed Dec. 22, 1953 7 Sheets-Sheet 7
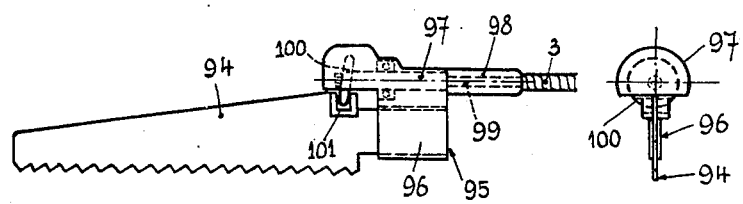
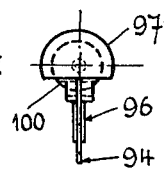
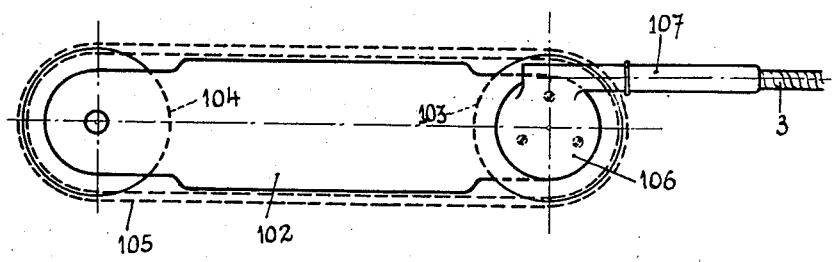
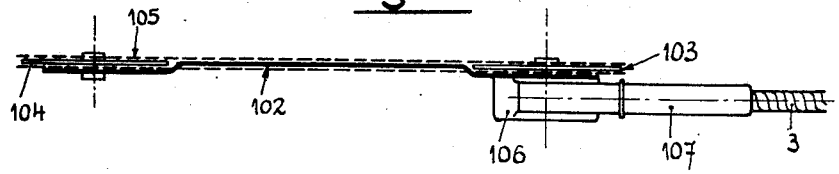
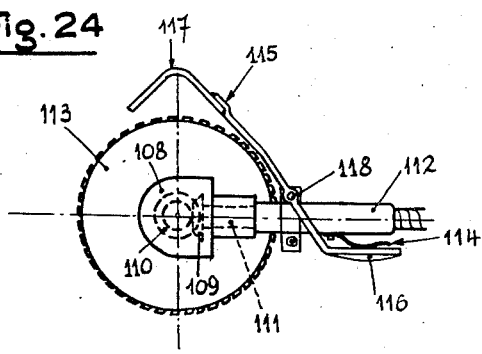
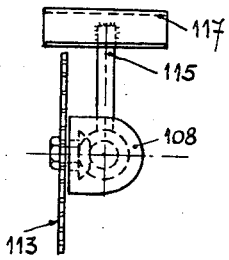
INVENTOR:
JACQUES MULLER
By: Young, Emery & Thompson
Attys.

United States Patent Office 2,817,205
Patented Dec. 24, 1957

2,817,205
PORTABLE POWER OPERATED TOOL
Jacques Muller, La Garenne-Colombes, France Application December 22, 1953, Serial No. 399,740

Claims priority, application France January 17, 1953

1 Claim. (Cl. 56—25.4)

The present invention relates to a portable apparatus with power operation intended for reducing fatigue and facilitating work of all kinds such as gardening work, horticulture, arboriculture, cleaning, stone work and in general all operations heretofore effected individually by means of tools held and operated by hand.

An important object of the invention is to provide an apparatus of the above mentioned character, having means to hold an interchangeable tool at an appropriate length from the operator and means to actuate such tool.

Another object of the invention is to provide means to control the work of such a tool, such means being conveniently located for the operator.

A further object of the invention is to provide means to conveniently fix the actuating means of the apparatus on the body of the operator, in such a way as not to interfere with the operator's movement.

A further object of the invention is to provide means to avoid unpleasant reactions of the motor unit on the operator's body.

The motor unit assembly should naturally be as small and light as possible so as not to inconvenience the user by the weight or by the space occupied. Moreover the force necessary and the duration of the work effected with the new apparatus should be much less than those resulting from the same work effected with hand tools. Moreover if the length of the handle or shank is suitably chosen it requires the operator to bend much less than with hand tools which again considerably reduces fatigue.

Other features of the apparatus according to the invention will be apparent from the following description of several embodiments with reference to the accompanying drawings on which:

Fig. 5 is a view in elevation with parts in section of a tubular rigid handle or shank connected by the rear end to a flexible shaft and carrying at the forward end a rotary work tool.

Fig. 6 is a plan view with partial sections of this tubular handle or shank.

Fig. 10 is a view in elevation of a rotating rake.

Fig. 11 is a view in plan of this rake.

Fig. 12 is a view in longitudinal section of a sifting shovel on the line XII—XII of Fig. 13.

Fig. 13 is a view in transverse section of this shovel.

Fig. 14 is a view in side elevation of a rotating drill or dibbler.

Fig. 15 is a view in side elevation of a rotating brush intended for the cleaning of masonry joints.

Fig. 16 is a view in side elevation of a rotating tool serving as a clipper, shears or the like.

Fig. 20 is a side elevation of a saw known as a single-operator saw.

Fig. 21 is an end view of this saw.

Fig. 22 is a side elevation of an endless chain saw.

Fig. 23 is a plan view of this saw.

Fig. 24 is a view in side elevation of a small circular saw.

Fig. 25 is an end view of this circular saw.

Figure 1:
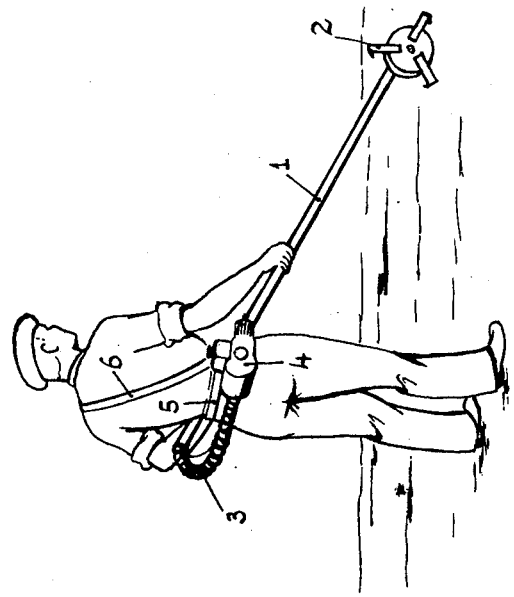
Fig. 1 is a side view of an operator concerned with digging or cultivating.
Figure 2:
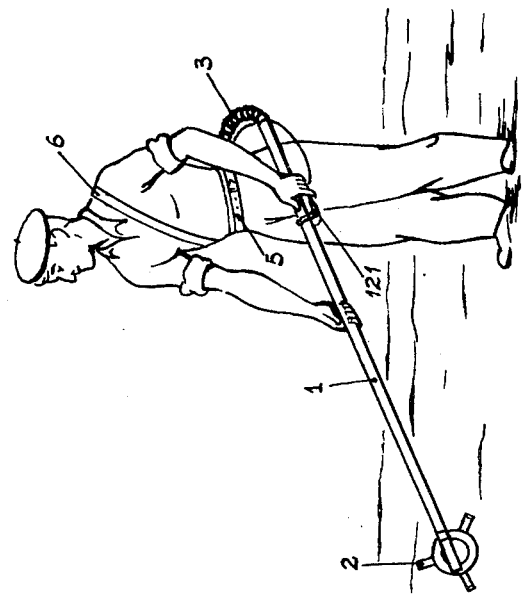
Fig. 2 is a rear view of this operator.

In the example of application shown on Figs. 1 and 2 the operator holds in his left hand the rear end of a straight rigid tubular handle or shank but carrying at the forward end a rotary digger 2 described in detail below while the rear end is coupled to a flexible shaft 3 surrounding the back of the operator to be in turn coupled to the output shaft of a motor unit 4 fixed to the right side of the operator by a harness comprised in this case by a waist belt 5 and a brace sling 6. Naturally the harness may be of a different kind, it may for example be comprised by two straight brace straps resting on the two shoulders. The motor unit may be a combustion engine arranged with a small motor spirit tank, a motor operating with compressed air or gas supplied by a pressure bottle forming part of the unit, an electric motor connected to a source of current, etc.

A control lever for the gas or a current switch 121 or the like is positioned adjacent the thumb or one finger to control the operation of the motor.

The right hand of the operator grips a more forward part of the member 1 so as to control it. It will be seen that the method of fixing the motor unit and its connection with the handle or shank by a flexible shaft passing to the rear of the back of the operator allows him full liberty of movement for effecting work of all kinds. This flexible shaft can be surrounded by a non-rotating protective sheath (not shown) connected at one end to the motor and at its opposite end to the handle or shank.

The motor unit is preferably fixed at the waist to the right or left and slightly to the rear for example by means of a waist band and a brace sling, with its output shaft substantially horizontal and to which is coupled the flexible handle or shaft which passes around the back of the operator so as to end near the rear extremity of the tubular member. Supposing that the operator holds the rear extremity of the handle or shaft in his left hand, the right hand being placed more forward, the motor unit will be fixed to the right side, and inversely if necessary. The motive source is thus arranged in such a way as not to interfere with the operator's movements.

Figures 3, 4:
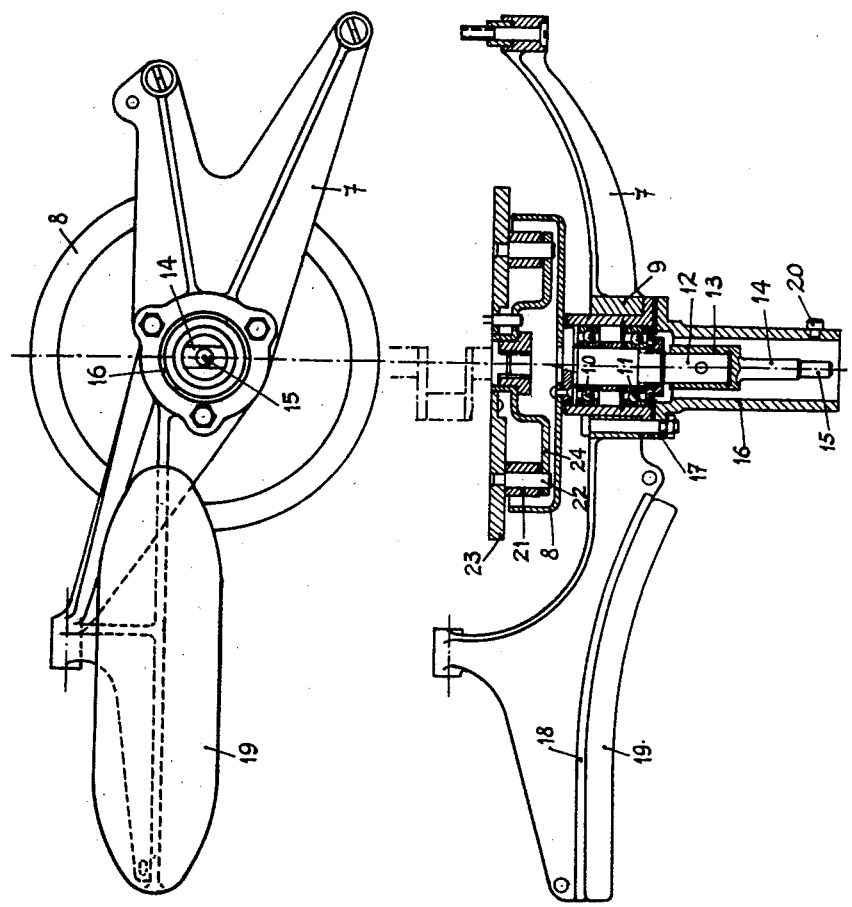
Fig. 3 is a side elevation on an enlarged scale of the motor unit comprised by a small internal combustion engine.
Fig. 4 is a view in partial plan of the same motor with parts in section.

The fixing device for the motor is shown on Figs. 3 and 4 thus for example it is possible to utilize a small auxiliary cycle motor which is completed by a support or shield 7 fitted in suitable manner to the motor for example on the side of the fly wheel 8. This support or shield embodies a bearing 9 located at the flywheel shaft and in which are fitted ball bearings 10, 11 receiving the driving shaft 12. On the free end of this output shaft is fixed by means of a cross pin a driving socket 13 extended axially by a driver 14 of substantially rectangular section which is itself terminated by a small cylindrical end 15 concentric on its axis. This element 13, 14, 15 is surrounded by a cylindrical sleeve 16 concentric with the shaft 12 and provided with a flange 17 by which it is firmly connected with the bearing 9 of the support or shield 7. The latter is also provided with a curved pad 18 arranged to follow the bodily form of the operator at the waist and which is fixed to the waist band 5 and to the ends of the shoulder strap 6. The waist belt 5 applies the pad against the body of the operator while the strap 6 supports the weight of the motor from the left shoulder. The concave face of the pad is provided with a cushion 19 of flexible material for example cellular sponge rubber, an air chamber or the like.

The sleeve 16 carries externally near its free end several pins 20 secured to the periphery and which form part of a bayonet coupling device for the protective sheath of the flexible shaft.

The fly wheel 8 rigid with the driving shaft 12 contains an automatic clutch and torque limiting device formed by centrifugal masses 21 pivoted to spindles 22 fixed between two circular plates 23, 24, rigid with the motor shaft.

Fig. 5 indicates the matter in which the flexible shaft is coupled to the handle or shank. The same arrangement is employed for coupling to the motor. The tubular part of the member 1 is extended at the rear end by a socket 25 to which it is fitted in any convenient manner. This socket carries in the same way as the socket 16, several pins 20 fixed to its periphery. An arbor 27 is mounted to rotate in a bush 28 fitted in the socket 25 and this arbor 27 is extended by the same driver 14 and the same cylindrical end part 15 as the socket 13. A coupling socket 29 fixed in any suitable manner is enclosed in the end of the sheath 3 of the flexible shaft 3a, and the periphery of the socket 29 fits exactly at its free end into the socket 25 of the handle or shank. An external collar 30 of the coupling socket 29 presses against the free end of the socket 25 and thus limits the amount to which it enters. A coupling sleeve in the form of a cup 31 is slidably mounted on the coupling socket 29, which cup is an easy friction fit on the outer periphery of the socket 25 and in the edge thereof there are cut bayonet slots 32 intended to cooperate on coupling with the pins 20. Between the base of the small cup 31 and the collar 30 there is interposed a helical compression spring 33. The end of the flexible shaft 3a fitted to and soldered, brazed or welded in an axial bore of a coupling head 34 mounted to float in the coupling socket 29 and having at the free end a diametral slot 35 in the base of which is cut an axial cylindrical hole 36. The driver 14 of the arbor 27 fits exactly in the slot 35 while the end element 15 fits exactly into the cylindrical hole 36 and the assembly thus comprises a coupling device for rotatably driving the arbor 20. The coupling head 34 is held concentrically on the axis of the coupling socket 29 by the cylindrical end part 13. The compression spring 33 retains the coupling by clamping on the one hand the collar 30 against the end of the socket 25 and on the other hand the bayonet notches of the sleeve 31 against the pins 20 of the socket 25. The operations of coupling and uncoupling may be effected rapidly and easily by a simple rotary movement of the sleeve 31.

A tube 37 is fitted to the end of the arbor 27 opposite to the driver 14 and is fixed by soldering, welding or braising, and said tube extends freely to the inside of the handle on shank 1 from one end to the other thereof. At the opposite end there is provided another arbor rotatably mounted in the handle or shank in any suitable manner and terminated by a coupling socket 38. A box 39 is connected to the free end of the handle or shank 1 which box contains a worm transmission mechanism (not shown) of which the input shaft 40 may come into engagement with the coupling socket 38 while the output shaft 41 is intended to receive the tool carrier 42 fitted on the extremity of the shaft 41 and held by a cross pin 43.

Various rotary tools for example, diggers, cutters, shovel like devices and the like may be fixed on the tool carrier 42 by means of several studs 119 and by shakeproof locking nuts 120.

Figs. 5 and 6 show a rotary digger or cultivator 44 comprising a support disc 44a and blades 44b the free ends of which are bent at right angles and the side pieces of which are sharpened to form cutters. The direction of rotation of the digger is indicated by an arrow on Fig. 5.

Figs. 7 to 25 show several methods of application of the apparatus according to the invention.

Figure 7:
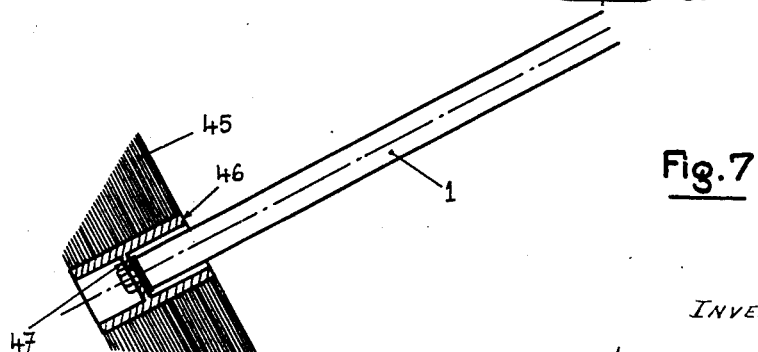
Fig. 7 is a diagrammatic view of a rotary brush.

Fig. 7 shows the example of a rotary brush. The bristles 45 of this brush are fixed on a cylindrical sleeve 46 having internally a transverse partition 47 and which is fitted with a certain play on the free end of the handle or shank 1. The transverse partition 47 is directly coupled to the socket 38 in suitable manner for example by means of an enclosed spindle fitting under considerable friction. The periphery of the brush is cut to cone shape which renders it more movable and convenient to handle.

Figure 8:
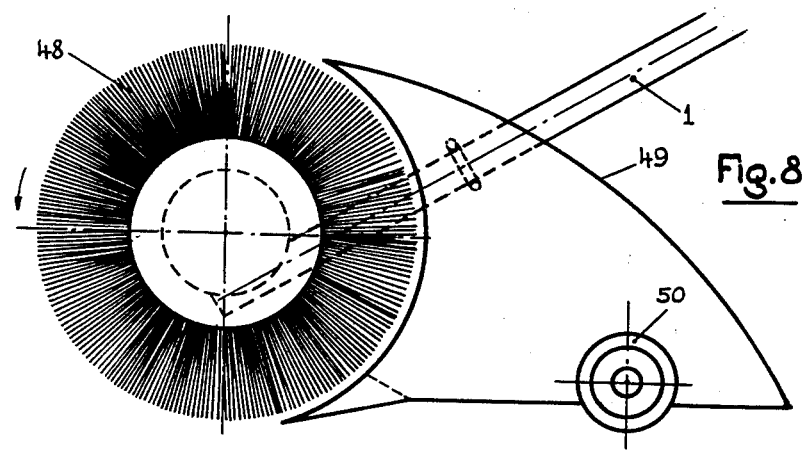
Fig. 8 is a side elevation view of a collector or sweeping brush.
Figure 9:
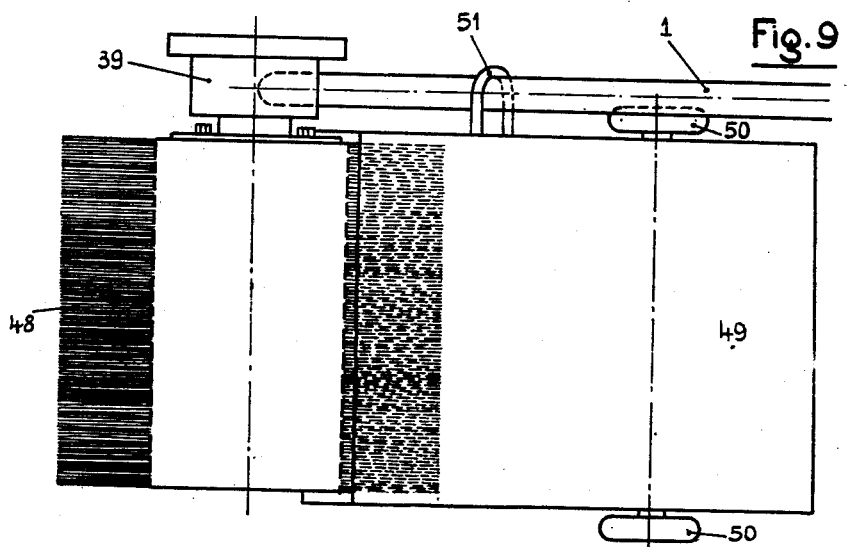
Fig. 9 is a plan view of this collecting or sweeping brush.

Figs. 8 and 9 show a sweeping brush. For this case the handle or shank 1 is provided with the gear box 39 utilized for the digger (Fig. 5) on the output shaft 41 of which is secured a rotating cylindrical brush 48 which rotates in front of the opening of a casing or hod 49 in such a way as to throw the sweepings towards the base of this hod the rear part of which rests on wheels 50 permitting it to be moved over the ground and to raise or lower the brush. The hod is connected to the handle or shank 1 by a loop 51 which prevents rotation thereof relatively to the handle or shank.

Figs. 10 and 11 show a rotary rake comprised by a circular plate 52 provided on one face with one or several circular rows of teeth 53. This plate is fixed to the output shaft of the gear box containing in this case two bevel pinions, one of which is rigid with the output shaft while the other is fixed to the input shaft intended to be connected to the socket 38 of the handle or shank 1 the free end of which is connected to the box.

Figs. 12 and 13 show a sifting shovel which comprises a casing formed by a rear transverse wall 54 from which project perpendicularly two longitudinal parallel walls 55 which are substantially triangular and which are provided on the lower edge with a re-entrant rib 56 extending from one end to the other. The rear wall embodies a central opening and comprises a support bearing 57 by which the shovel is fixed directly to the free end of the handle or shank 1. A sifter device formed by a box having a transverse rear wall 58 rests on the two ribs 56, two parallel longitudinal walls 59 which are also triangular extend perpendicularly from the wall 58. The rear and longitudinal walls are connected together by a perforated base 60. The sifter 13 is pivoted to the frame at the front by two co-axial pins 61 while the perforated base is provided at the rear with a holding ring 62 permitting it to be withdrawn and changed according to the degree of sifting required. A vertical guide 63 open at the base is fixed to the rear face of the wall 58 of the sifter and is in engagement with an eccentric or rotating cam 64 which is directly coupled to the shaft 37 mounted to rotate in the handle or shank 1. The case being rigidly connected to the handle or shank 1 it will be seen that rotation of the cam 64 driven directly by the shaft 37 produces by means of the guide 63 a transverse reciprocatory movement of the sifter which during the movement slides on the longitudinal ribs 56. The mounting of the sifter on the pins 61 is so chosen that transverse sliding is possible. The lateral walls 55 of the frame are spaced at the forward ends by a piece of metal 65 folded towards the inside of the shovel at the forward end of the sifter and this permits the operator to take up materials to be sifted as with an ordinary shovel. The operator having taken the shovel full of material it is sufficient for him to hold it or to place the shovel above the desired point to receive the particles sifted by the reciprocatory movement.

Fig. 14 shows a drill or dibbler. There is shown a gear box 66 provided with two handles 67 forming a type of holder and also comprising a tubular side member 68 intended to be directly fitted to and fixed on the sheath 3 of the flexible shaft. A shaft end is rotatably mounted in this tubular member one end of which is to be coupled to the flexible shaft 3a while the other end carries internally of the box a bevel pinion 69 engaging another bevel pinion 70 rotatably rigid with an arbor 71 rotatably mounted in the base of the box and which is intended to receive a rotary tool 72 comprising the interchangeable drill or dibbler properly speaking, having for example the form of a flat strap twisted into a helix. The operator may use this apparatus as an ordinary drill or dibbler except that he is provided with a guide for controlling the tool and this is sufficient for him to follow the drilling operation with this tool instead of applying pressure which considerably reduces fatigue and permits him to work much more rapidly than with an ordinary drill or dibbler.

Fig. 15 shows a rotary brush intended for cleaning masonary joints. It relates to a flat circular metal brush 73 the wires of which are fixed to a hub 74 rigid with a shaft end rotatably mounted in a sleeve which may be fitted to and fixed directly on the sheath 3 of the flexible shaft. The method of utilising the brush will be readily understood. The operator guides the brush by means of the sleeve 75 which serves as a handle.

Figure 16:
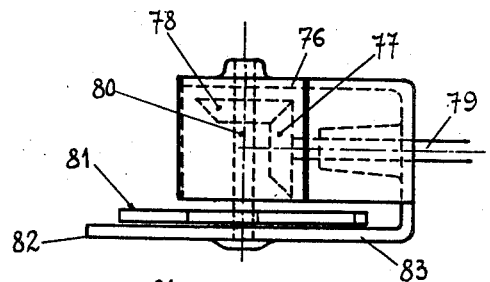
Figure 17:
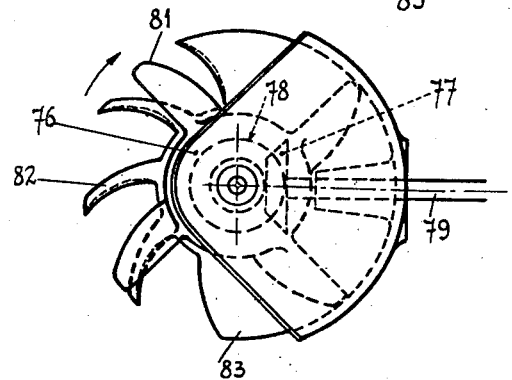
Fig. 17 is a plan view of this tool.

Figs. 16 and 17 show a tool adapted for use in the manner of shears or clippers. A gear box 76 contains a train of two bevel pinions 77 and 78 one of which is rigid with a shaft end 79 projecting laterally from the box and intended to be coupled to the shaft contained by the handle or shank 1. The other pinion 78 is rigid with a shaft 80 which is disposed vertically in the position of use, projecting downwardly from the base of the box 76 and carrying a rotary circular multi-blade cutter 81. This cutter may turn in relation to a fixed semi-circular counter blade 82 cut in a flange member 83 secured to the box.

Figure 18:
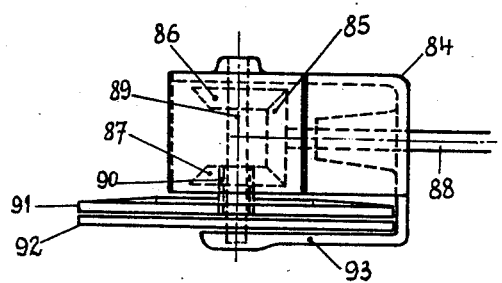
Fig. 18 is a view in side elevation of a rotary tool adapted for use as a grass trimmer.
Figure 19:
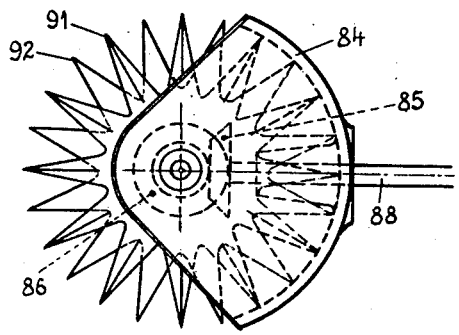
Fig. 19 is a plan view of this tool.

Figs. 18 and 19 show a tool adapted for use as a grass cutter or clipper. A box 84 contains a train of three bevel pinions 85, 86, 87 one of which is rigid with a shaft end 88 extending laterally from the box and intended to be coupled to the shaft contained within the handle or shank 1. Another pinion 86 is rigid with a shaft 89 which is vertical in the position of use and projecting from the base of the box. The third pinion 87 is rigidly connected to a hollow shaft end 90 mounted to rotate in the base of the box and on the shaft 89. The end of the hollow shaft 90 carries externally of the box a circular cutter 91 having numerous teeth while the shaft 89 carries at its lower part an identical but oppositely disposed circular cutter 92. The two pinions 86, 87 engage the pinion 85 at two diametrally opposite points so that they rotate in opposite directions thus also driving the cutters 91, 92 in opposite directions. The lower end of the shaft 89 is arranged to rotate in a flange 93 connected to the box.

Figs. 20 and 21 show a saw of the single handed type. The saw 94 is slidably mounted by a tail piece 95 in a guideway 96 forming part of a support 97 extended by a tubular handle 98 adapted to be fitted to and fixed directly on the sheath 3 of the flexible shaft and in which is rotatably mounted a shaft end 99 which is to be coupled to the flexible shaft 3a. To the forward end of the shaft element 99 is fixed an inclined or oscillating disc 100 which engages a notch 101 in the saw. It will be seen that the rotation of the disc 100 thus produces a reciprocatory movement of the saw.

Figs. 22 and 23 show an endless chain saw in which two pulleys 103, 104 are rotatably mounted at the ends of a flat elongated support 102 and endless chain 105 provided with saw teeth passes over the pulleys. A gear box 106 is fixed to one end of the support 102 which box is adapted to contain a worm driving train. The shaft end carrying the worm is rotatably mounted in tubular handle 107 forming an extension of the box and intended to be fitted to and fixed directly on the sheath 3 of the flexible shaft.

Figs. 24 and 25 show a small circular saw. The gear box 108 contains a gear train consisting of two bevel pinions 109, 110 one of which is rigid with the shaft end 111 mounted to rotate in a tubular handle 112 forming an extension of the gear box and intended to be fitted to and fixed directly on the sheath 3 of the flexible shaft. The other pinion is rigid with a sheath end carrying a circular saw blade 113 externally of the box. The box 108 is formed in one piece with an arm extending radially from the periphery of the blade 113 and at the free end of which is fitted a hook 115 which partially surrounds the blade to a point adjacent the handle 112 where it is terminated by a lever 116. The hook 115 embodies a crank part 117 forming an extension of the handle 112 providing a certain space between the hook and the periphery of the blade 113.

In the use of this circular saw the spring 114 opens the hook 115 by causing it to pivot about the point 118, causing it to move away from the periphery of the blade to enclose and grip for example a tree branch to be sawn.

Without departing from the principle of the invention naturally numerous other applications of the portable apparatus according to the invention can be envisaged.

What I claim is:

A portable tool operating apparatus of the character described comprising in combination a motor unit having an output shaft, a support for holding said motor unit, said support including a bearing in which the output shaft rotates and a curved body engaging member located at one side of said bearing, means connected to said support for securing said support and the motor unit to one side of an operator's body substantially at the level of the waist with the output shaft of the motor unit substantially horizontal in rear of the operator and directed towards the operator's other side, a cushion of flexible material secured to the concave face of said body engaging member, a flexible shaft connected at one end to the output shaft of the motor unit and adapted to pass around the operator's back to his other side and forwardly of the operator, a straight rigid tubular shank the size and length of which being such that an operator can manipulate it like a broomstick, a shaft rotatably mounted in said tubular shank, means connecting the bank end of said last-mentioned shaft to the other end of the flexible shaft, and means detachably and interchangeably connecting a tool to the fore end of the tubular shank and to the fore end of its shaft.

References Cited in the file of this patent

UNITED STATES PATENTS

| | | |
|---|---|---|
| 1,405,164 | Schein | Jan. 31, 1922 |
| 1,426,989 | Janes et al. | Aug. 22, 1922 |
| 1,981,076 | Sells | Nov. 20, 1934 |
| 2,586,954 | Juliano | Feb. 26, 1952 |
| 2,645,010 | Homes | July 14, 1953 |

FOREIGN PATENTS

| | | |
|---|---|---|
| 238,239 | Great Britain | Feb. 25, 1926 |
| 833,853 | France | July 25, 1938 |